US006911996B1

(12) United States Patent
Takemoto

(10) Patent No.: US 6,911,996 B1
(45) Date of Patent: Jun. 28, 2005

(54) FLUOROSCOPY IMAGE APPARATUS

(75) Inventor: Takayuki Takemoto, Joyo (JP)

(73) Assignee: Shimadzu Corporation, Kyoto (JP)

( * ) Notice: Subject to any disclaimer, the term of this patent is extended or adjusted under 35 U.S.C. 154(b) by 780 days.

(21) Appl. No.: 09/721,638

(22) Filed: Nov. 27, 2000

(30) Foreign Application Priority Data

Dec. 28, 1999 (JP) ............................................ 11-375429

(51) Int. Cl.⁷ .............................. H04N 9/47; H05G 1/64
(52) U.S. Cl. ......................................... 348/61; 378/98.8
(58) Field of Search .......................... 378/41–42, 62–63, 378/98.2–98.9, 114–115, 28–29, 44–46, 98; 348/61, 65, 68–71, 77, 521–522; 250/370.08, 370.09; 382/128, 130–132

(56) References Cited

U.S. PATENT DOCUMENTS

| 4,160,266 A | * | 7/1979 | Kurihara ................... 378/98.2 |
| 4,185,198 A | * | 1/1980 | Fujimoto .................. 378/98.5 |
| 4,531,154 A | * | 7/1985 | Hallock ..................... 348/510 |
| 5,058,148 A | * | 10/1991 | Plut et al. ................. 378/98.2 |
| 5,509,044 A | * | 4/1996 | Horbaschek ................. 378/97 |
| 5,666,395 A | * | 9/1997 | Tsukamoto et al. ........ 378/98.4 |
| 5,852,296 A | * | 12/1998 | Tsukamoto et al. .... 250/370.09 |
| 5,949,957 A | * | 9/1999 | Yamada et al. ............. 386/117 |
| 6,044,131 A | * | 3/2000 | McEvoy et al. ............ 378/162 |
| 6,163,029 A | * | 12/2000 | Yamada et al. ........ 250/370.09 |
| 6,232,607 B1 | * | 5/2001 | Huang ................... 250/370.09 |
| 6,330,303 B1 | * | 12/2001 | Yamane et al. ............ 378/98.8 |
| 2002/0191828 A1 | * | 12/2002 | Colbeth et al. ............. 382/132 |

* cited by examiner

Primary Examiner—Chris Kelley
Assistant Examiner—Dave Czekaj
(74) Attorney, Agent, or Firm—Manabu Kanesaka

(57) ABSTRACT

In a fluoroscopy image apparatus of the invention, in case an ordinary control circuit for an image sensor is out of order, a D/A switching mechanism is switched to analog, and a plurality of pixels of the image sensor is controlled as one pixel unit by a pixel control circuit. By TV standard scanning system signals generated in a TV reference signal circuit, the image sensor is scanned through the gate driver circuit. In a picture signal superimpose circuit, X-ray image signals from a readout amplifier are superimposed on a TV frame synchronization signal of the TV standard scanning system, and outputted as analog video signals. The analog video signals are transmitted to an external monitor to be displayed.

7 Claims, 4 Drawing Sheets scanning order horizontal scanning waveform frame cycle
vertical scanning wave form 17 horizontal synchronization pulse
18 black level
16 white level
19 blanking pulse
15 picture signal
time

FLUOROSCOPY IMAGE APPARATUS

BACKGROUND OF THE INVENTION AND RELATED ART STATEMENT

The present invention relates to an image apparatus which can see or visualize a fluoroscopy image at real time, and in particular, the present invention relates to a fluoroscopy image apparatus for the purpose of a medical diagnosis.

In recent years, there has been developed a radiation image-taking apparatus or radiography apparatus using a semiconductor image-taking sensor or image sensor in place of X-ray films or imaging plates which have been used in a simple radiography apparatus. There are two types of image sensors. A first type of the image sensor is formed of an X-ray converting layer which converts X-ray into light; photodiode arrays which are arranged in a matrix form right under the X-ray converting layer; and TFT switches connected to the respective photodiode arrays. In the first type of the image-taking sensor, after irradiation of X-ray, the respective TFT switches are sequentially turned on, so that signal charges stored in respective pixels are read out to form an X-ray image.

A second type of the image sensor has radiation sensor arrays formed of converting layer which responds to the radiation to directly output charge signals corresponding to incident dose or amount, and TFT switches are connected to electrodes disposed in a matrix form right under the radiation sensor arrays. In the second type of the image sensor, the respective TFT switches are sequentially turned on at the time of irradiation, so that signal charges stored in respective pixels are read out to form an X-ray image. Hereunder, the first type of the image sensor will be explained.

FIG. 3 and FIG. 4 show a conventional radiation image apparatus of the aforementioned first type. This apparatus is formed of an image-taking sensor or image sensor 1; a gate driver circuit 2 for sequentially taking out charge signals from the respective pixels 14; a readout amplifier 3 for reading the charge signals from the respective pixels 14; and a control circuit 4 for controlling the gate driver circuit 2 and the readout amplifier 3. And, X-ray picture digital data signals from the image sensor 1 are outputted from the readout amplifier 3 to an outside.

In the image sensor 1, the pixels 14 are regularly arranged two-dimensionally, i.e. in the length and breadth directions. The gate driver circuit 2 is driven by a signal from the control circuit 4, so that pulse signals are sequentially sent to the respective pixels 14 from the line direction through gate lines 13. On the other hand, the readout amplifier 3 is driven by a signal from the control circuit 4, so that X-ray picture charge signals in the respective pixels 14 are sequentially read out from the row or columnar direction through readout signal lines 12.

In each pixel 14, there is a photoelectric conversion element 10. Namely, a scintillator emits light in response to an incidence intensity of X-ray, and the emitted light enters into a photodiode to generate a charge signal. At a position located at a side opposite to an X-ray incidence side and corresponding to each pixel 14, a transistor switch, for example, an FET having a signal readout switching function, is arranged two-dimensionally in each pixel 14. By switch pulses from the gate driver circuit 2 through the gate lines 13, the charge signals are read out to the readout amplifier 3 through the readout signal lines 12.

The X-ray picture digital data signals from the image sensor 1 are outputted from the readout amplifier 3 to the outside. However, since the sensitivities of the respective pixels 14 of the image sensor 1 are irregular and there might be defective pixels, a correction processing circuit 5 is generally provided to carry out a correction process, such as a gain correction, and at the same time, the correction processing circuit 5 carries out an offset correction (correction for returning to a zero level when there is no X-ray input). Furthermore, in order to see the X-ray image better, an image processing circuit 6 is provided to carry out an image processing, such as edge enhancement for the X-ray picture digital data signals, or smoothing.

As described above, one X-ray photograph is taken by spending a time, or images are taken at real time in the rate of more than ten images per second.

The conventional fluoroscopy image apparatus is structured as described above, and in the ordinary sequence control, a control section for controlling an entire system is often used as a system which combines a movement control mechanism for an X-ray generator, an X-ray tube, an examination table, a flat panel type image-taking apparatus or the like, and a data collection control mechanism. And, as the system becomes complicated, a possibility of a system failure of the control section for controlling the system to be inoperative becomes higher. For example, in case an operation is performed by using the aforementioned apparatus, the system failure of the control circuit for controlling the system resulting in failure to obtain the X-ray image means losing an important tool for the operation. In this case, there is a task that if only the X-ray generation in the apparatus is possible, a control system of the conventional flat panel type image-taking apparatus might be switched to a mechanism which can individually control, so that the output signal can be taken out to be observed by a general TV monitor.

The present invention has been made in view of the foregoing, and an object of the invention is to provide a fluoroscopy image apparatus, wherein even if a control system is shut down and an X-ray image can not be obtained while operating the apparatus, in case the X-ray generation in the apparatus is possible, the flat panel type image-taking apparatus can be individually operated and an output signal can be taken out, so that the X-ray image can be observed by a general TV monitor.

Further objects and advantages of the invention will be apparent from the following description of the invention.

SUMMARY OF THE INVENTION

To achieve the aforementioned object, the present invention provides a fluoroscopy image apparatus, comprising: two-dimensional radiation sensor arrays formed of photo-electric conversion elements for outputting charge signals corresponding to an incident amount by responding to a radiation; TFT switches arranged in a matrix form right under the radiation sensor arrays and connected to the photoelectric conversion elements; a gate driver circuit for turning on the respective TFT switches in case of reading out the signals; a readout amplifying circuit for reading out charge signals stored in respective pixels; a control circuit for controlling the gate driver circuit and the readout amplifying circuit; a TV reference signal circuit formed of a horizontal scanning/synchronization pulse waveform generating circuit and a vertical scanning/synchronization pulse waveform generating circuit; and a picture signal superimposed circuit for driving the gate driver circuit by a signal from the TV reference signal circuit and taking out picture signals from the radiation sensor arrays through the readout amplifying circuit. The picture signal superimposed circuit superimposes the picture signals on the signal from the TV reference signal circuit by synchronizing with the signal from the TV reference signal circuit, and outputs a TV analog video signal.

Also, in the apparatus of the invention, the control circuit controls the gate driver circuit and the readout amplifying circuit so that a plurality of pixels is joined as one pixel unit when the charge signals of the radiation sensor arrays are read out and scanned.

Further, the apparatus of the invention is provided with wireless transmitting means which can wirelessly transmit the analog video output signal.

Also, the apparatus of the invention is provided with a digital-to-analog switching circuit which is capable of switching between a digital video control and an analog video control to use one control.

The fluoroscopy image apparatus of the invention is structured as described above. The gate driver circuit is driven by signals from the TV reference signal circuit, and the picture signals from the radiation sensor arrays are taken out through the readout amplifying circuit. Also, the picture signals are superimposed by synchronizing the signals from the TV reference signal circuit, and the TV analog video signal. Therefore, apart from the ordinary control sequence, in the individual flat panel type image-taking apparatus, the X-ray image can be displayed in the monitor.

Also, since the gate driver circuit and the readout amplifier are controlled to be driven so that a plurality of pixels is combined as one pixel unit when the charge signals of the radiation sensor arrays are read out and scanned, the effective sensor region can be further enlarged.

Further, since the analog video output signals can be transmitted to the monitor by wireless transmitting means which is capable of transmitting wirelessly, a cable is not necessary, and the X-ray image can be observed by the monitor at a remote place.

Also, since the apparatus of the invention is provide with the digital-to-analog switching circuit which switches between the digital video control and the analog video control to use the switched control, the monitor disposed beside the apparatus and the monitor at the remote place can be switched to each other to be used in accordance with the necessity.

DETAILED DESCRIPTION OF PREFERRED EMBODIMENTS

Figure 1:
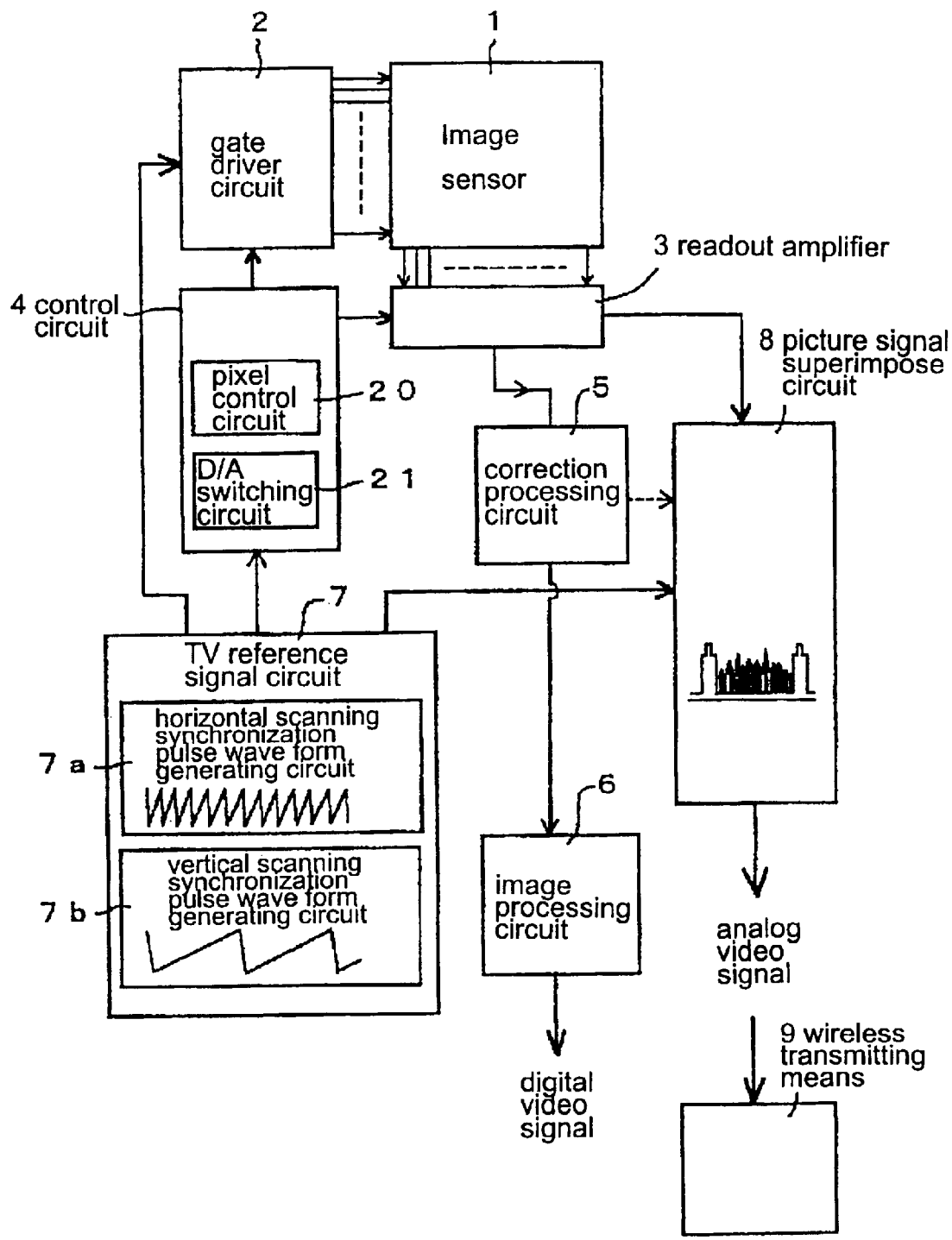
FIG. 1 is a diagram showing an embodiment of a fluoroscopy image apparatus of the invention.
Figure 2A:
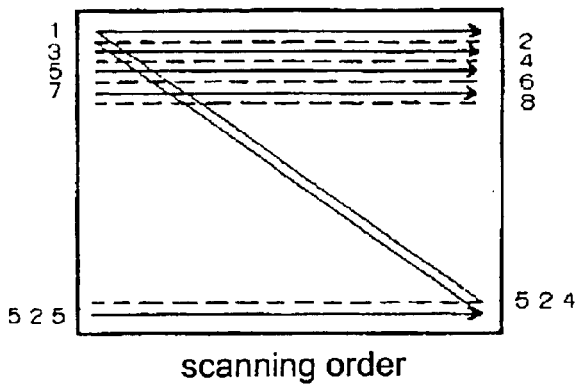
FIGS. 2(a) through 2(d) are explanatory views for explaining a TV scanning system of the fluoroscopy image apparatus of the invention.
Figure 2B:
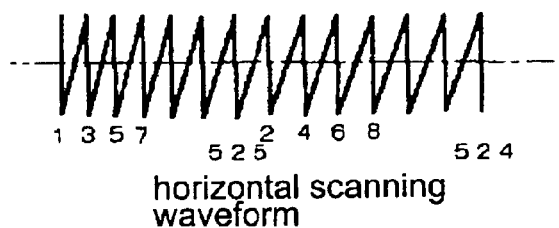
Figure 2C:
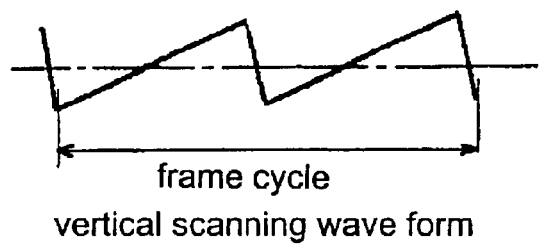
Figure 2D:
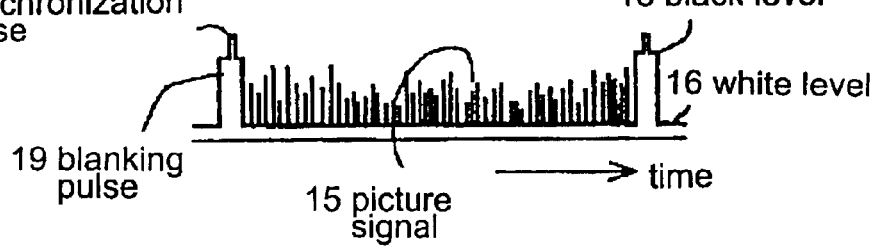
Figure 3:
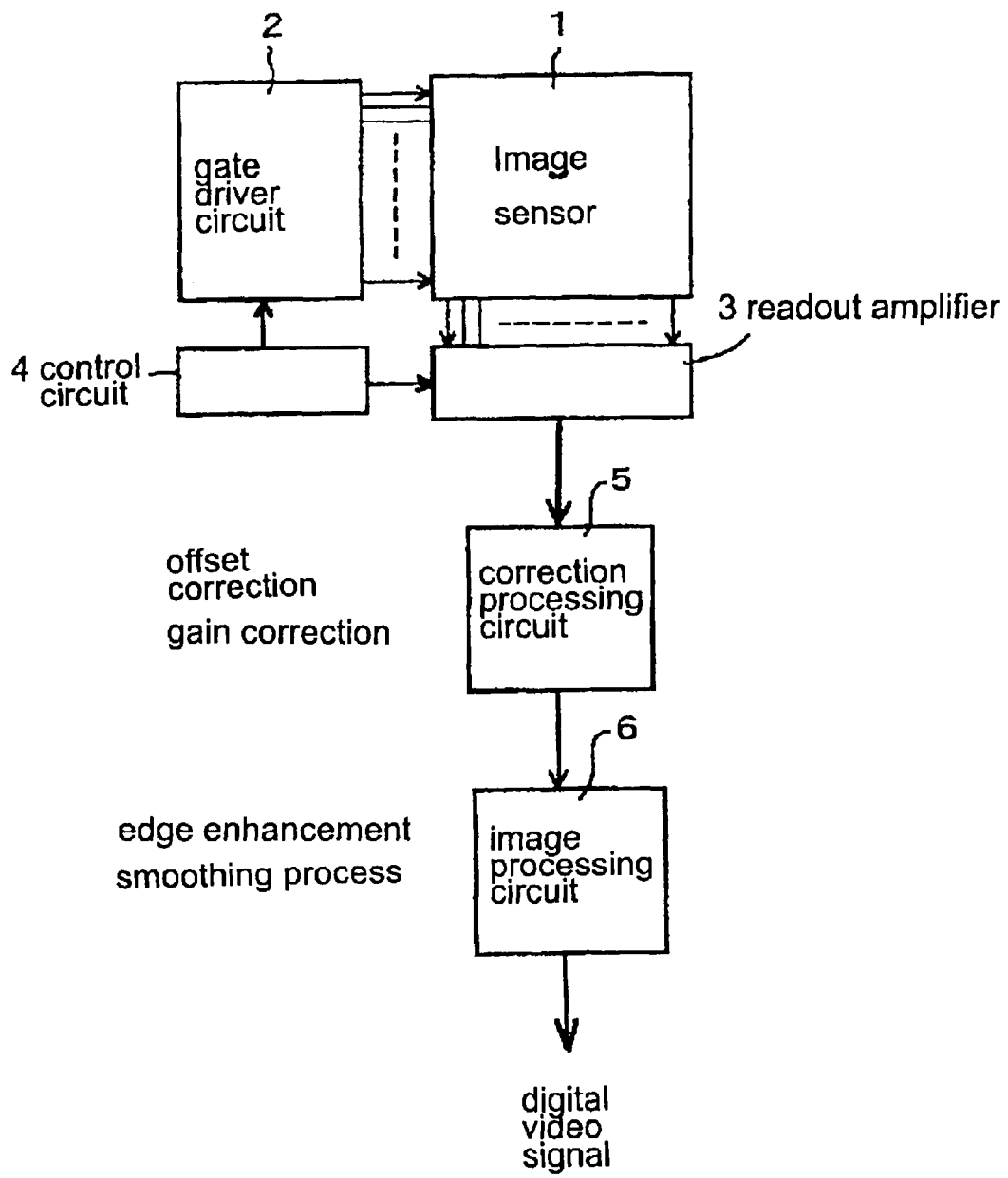
FIG. 3 is a diagram showing a conventional fluoroscopy image apparatus.

Embodiments of a fluoroscopy image apparatus of the invention will be explained with reference to FIG. 1. FIG. 1 is a view showing a picture signal system diagram of the fluoroscopy image apparatus of the invention.

The apparatus of the invention is formed of an image-taking sensor or image sensor 1 for generating charges of an X-ray picture in response to incident X-ray intensity; a gate driver circuit 2 for sequentially taking out charge signals from respective pixels 14; a readout amplifier 3 for reading the charge signals from the respective pixels 14; a control circuit 4, which includes a pixel control circuit 20 and D/A (digital-to-analog) switching circuit 21 and controls the gate driver circuit 2 and the readout amplifier 3; a TV reference signal circuit 7 which includes a horizontal scanning/synchronization pulse waveform generating circuit 7a and a vertical scanning/synchronization pulse waveform generating circuit 7b; a picture signal superimpose circuit 8, which drives the gate driver circuit 2 by a signal from the TV reference signal circuit 7 and takes out the picture signals from the image sensor 1 through the readout amplifier 3, so that the picture signals are superimposed by synchronizing to the signal from the TV reference signal circuit 7 to output a TV analog video signal; wireless transmitting means 9 for wirelessly transmitting the analog video signal to the outside without using a cable; and a correction processing circuit 5 which performs a sensitivity correction and an offset correction.

Figure 4:
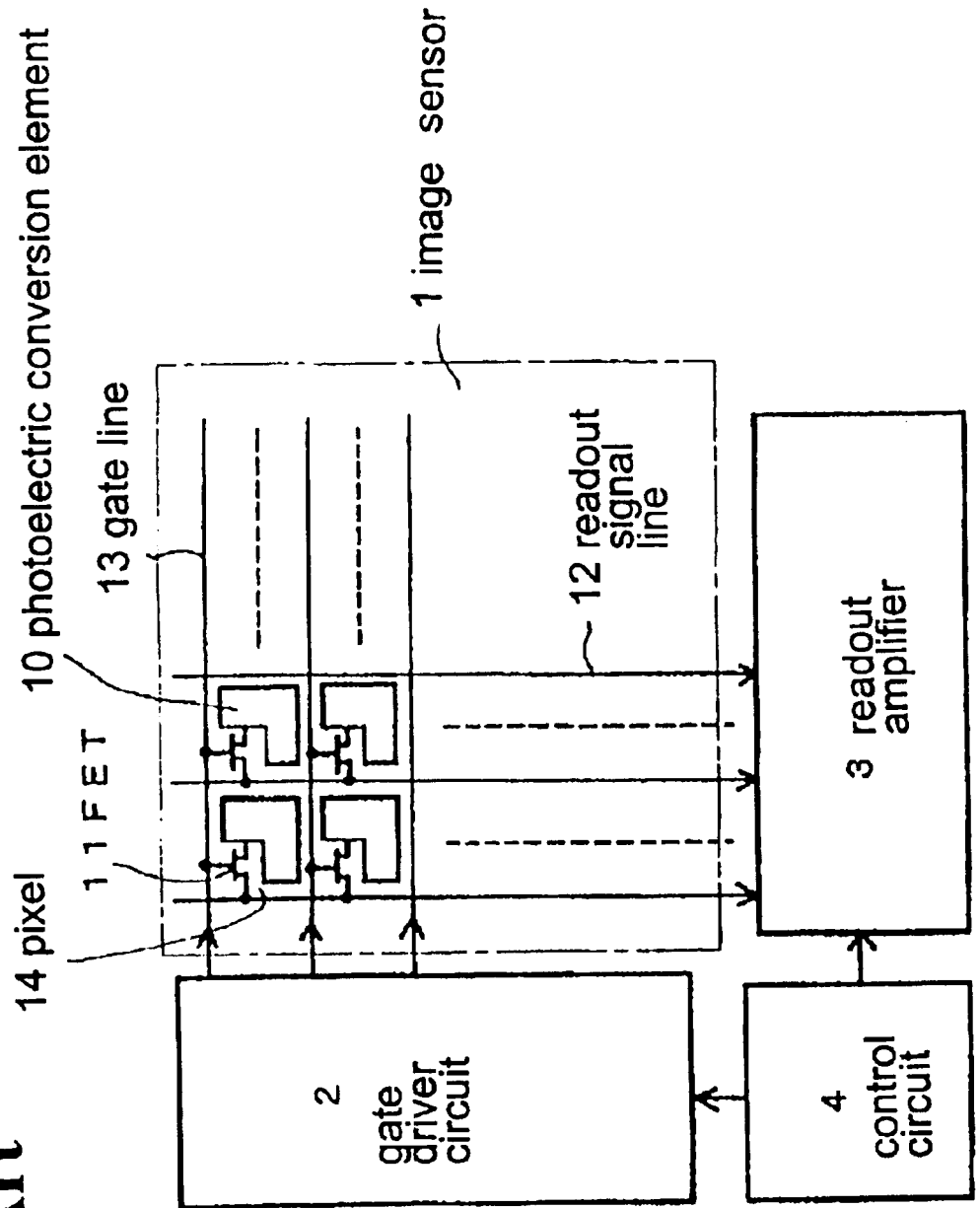
FIG. 4 is an explanatory view for explaining a scanning of an image sensor of the conventional fluoroscopy image apparatus.

As in the apparatus shown in FIG. 4, in the image sensor 1, the pixels 14 are regularly arranged two-dimensionally. Also, the gate driver circuit 2 is driven by the signal from the control circuit 4 so that pulse signals are sequentially sent to the respective pixels 14 from the line direction through gate lines 13. On the other hand, the readout amplifier 3 is driven by signals from the control circuit 4, and X-ray picture signals in the respective pixels 14 are read out from the column or row direction through readout signal lines 12.

In the control circuit 4, there are provided the pixel control circuit 20 and the D/A switching circuit 21 which are added to the conventional circuit. And, the control circuit 4 sends the signals to the gate driver circuits 2 and the readout amplifier 3 to drive the same. When an ordinary digital video signal is outputted, the respective pixels 14 are sequentially scanned as in the conventional apparatus. However, as the fluoroscopy image apparatus of the invention, in case an analog video signal is to be outputted, the D/A switching circuit 21 provided in the control circuit 4 is switched to the analog side, and the pixel control circuit 20 is switched when the charge signals of the image sensor 1 are read out and scanned, so that the gate driver circuit 2 and the readout amplifier 3 are controlled and driven by making a plurality of the pixels 14 as one pixel unit. Accordingly, an effective sensor region can be enlarged.

In the TV reference signal circuit 7, in order to read out and scan the charge signals of the image sensor 1 by a standard TV scanning system, the horizontal scanning/synchronization pulse waveform generating circuit 7a and the vertical scanning/synchronization pulse waveform generating circuit 7b are provided. By the signal from the TV reference signal circuit 7, the gate driver circuit 2 is controlled, and by the signal from the control circuit 4, the charge signals of the image sensor 1 are read out and scanned by the standard TV scanning system. Also, a synchronizing signal of the horizontal scanning/synchronization pulse waveform generating circuit 7a and a synchronizing signal of the vertical scanning/synchronization pulse waveform generating circuit 7b are simultaneously sent to the picture signal superimpose circuit 8.

In the picture signal superimpose circuit 8, the picture signals, outputted from the X-ray charge signals of the image sensor 1 through the readout amplifier 3 based on the TV standard scanning system, are synchronized with the horizontal scanning synchronization pulse and the vertical scanning synchronization pulse from the TV reference signal circuit 7, and superimposed on the TV standard scanning signal to output as the standard analog TV scanning signals to the outside. By this standard analog TV scanning signals, the X-ray image can be displayed in an external general TV monitor.

The wireless transmitting means 9 is provided with an antenna or an infrared ray source, and in order to send the analog video signal to the external monitor without using the cable, the analog video signal can be sent to the external monitor by using the wireless transmitting means 9, such as a radio wave or an infrared ray.

The correction processing circuit 5 performs a correction process, such as a gain correction, since the sensitivities of the respective pixels 14 are not uniform and there is a case that defective pixels exist. At the same time, the correction processing circuit 5 performs an offset correction for correcting a readout signal to a zero level when there is no X-ray input.

FIGS. 2(*a*) through 2(*d*) show views for explaining a standard TV scanning method of the apparatus of the invention. The method is explained along NTSC (National Television System Committee) as the standard scanning. In the NTSC, there is used an interlace system with 525 scanning lines and aspect rate of 4 to 3. The image sensor 1 normally includes a matrix of several thousands×several thousands, for example, the pixels 14 of 2,000×2,000, and signals are read out per row by switching the respective lines to obtain the X-ray image. Therefore, a plurality of pixels 14 is joined and scanned as one pixel. For example, three pixels in a horizontal direction are bracketed or joined as one pixel unit and three pixels in a vertical direction are bracketed or joined as one pixel unit, so that in 525 scanning lines, a number of pixels both in the vertical direction and the horizontal direction is 525×3=1,575, and these 1,575 pixels are effectively used. When the pixel control circuit 20 provided in the control circuit 4 is switched and set, the number of the pixels can be changed.

First, as shown in FIG. 2(*a*), the image sensor 1 is sequentially scanned as 1, 3, 5, 7, . . . 525 from an upper left in an upper section, and then scanned as 2, 4, 6, 8, . . . 524 from the upper left in the upper section. By the interlace with 2 to 1, one frame is structured. FIG. 2(*b*) shows a horizontal scanning waveform, and a single serrate wave constitutes a scanning drive voltage waveform. FIG. 2(*c*) shows a vertical scanning waveform, and the surface to be scanned is interlaced and scanned twice. FIG. 2(*d*) shows a picture signal 15 superimposed on the TV standard scanning signal. An abscissa constitutes a time axis, and FIG. 2(*d*) shows one horizontal scanning signal. A white level 16 is set at a lower portion of the figure, and designates a level in the condition that there is no input signal. In order to synchronize an interval from a start point of the scanning line to a turning point, a horizontal synchronization pulse 17 is set, and while the line is being returned in scanning, a blanking pulse 19 is set to be a black level. The vertical synchronization pulse is set similarly, and when a signal is being returned vertically, a blanking pulse is set to be a black level 18.

In the apparatus of the invention, the control circuit 4 used at the time of generating the digital video signal is not used at the time of generating the analog video signal, and switched by the D/A switching circuit 21, so that the TV reference signal circuit 7 drives the gate driver circuit to scan. Namely, the TV reference signal circuit 7 has a mode which outputs analog image signals (TV signals of NTSC (EIA) and PAL (CCIR)).

There are 525 scanning lines in NTSC, and there are 625 scanning lines in PAL. These scanning lines are allowed to respond to the respective lines of the image sensor 1, and the signals are sequentially outputted in the row direction, so that these analog signals can be outputted.

Incidentally, although NTSC (EIA) and PAL (CCIR) are the TV signals having an aspect ratio of 4 to 3, TV signals are not limited to these signals, and can be TV signals with other aspect ratio.

Namely, in the image sensor 1, apart from the sequence mode which switches the respective lines to collect the images based on the signal from the control circuit 4, for example, in case of the NTSC (EIA), there may be provided the TV reference signal circuit 7 for forming the reference signal, such as TV frame synchronization signal regulated to have a horizontal scanning frequency of 15.75 Hz and a vertical scanning frequency of 60 Hz, and the picture signal superimpose circuit 8 which switches the respective lines in response to these signals and mixes these signals with the synchronization signals to output the mixed signals. Also, an analog output terminal is provided.

Then, the correction processing circuit 5 is disposed in the vicinity of the readout amplifier 3, so that the sensitivity correction and the offset correction are carried out per pixel 14 at real time by using a correction table. Therefore, even though the image processing, such as an edge enhancement and smoothing, can not be operated, only the sensitivity correction and the offset correction can be performed inside a flat panel main body. In this case, preferably, the signal of each pixel 14 is once converted from analog to digital to be a digital signal, and after correction operation, the signal is converted from digital to analog to be an analog signal.

Further, addition of analog signals switched every two pixels 14 can be operated both on the analog using a multiplexer and on the digital. For example, it is presumed that the number of the pixels 14 of the image sensor 1 is 2,000 (lengthwise)×2,000 (breadthwise). Assuming that there are 525 vertical scanning lines and an aspect ratio of 4 to 3, at the time of scanning the image sensor, if the sensor is scanned per pixel 14, there is used a region of 525 (lengthwise)×700 (breadthwise). And, by switching the pixel control circuit 20 provided in the control circuit 4, vertical two pixels 14 and horizontal two pixels 14 are bracketed or joined as one pixel unit. Then, the scanning signals in the vertical direction from the pixel control circuit 20 are inputted into the gate driver circuit 2, and the readout signals in the horizontal direction are inputted into the readout amplifier 3, so that two gate lines 13 and two readout signal lines 12 are allowed to scan at the same time.

Added signals are inputted into the picture signal superimpose circuit 8 as the picture signals from the readout amplifier 3. In this case, there is used a region of 1,050 (lengthwise)×1,400 (breadthwise). Although the addition is operated by the digital process in the scanning method of the pixels 14 of the image sensor 1 in the foregoing, the addition can be operated by another method. For example, the pixels 14 are scanned every vertical two pixels 14 and the horizontal pixels 14 are read out per pixel 14, and front and rear signals are added by the analog signals in the readout amplifier 3.

Also, although the cable is necessary in order to send the analog video signals to the monitor, the signals can be transmitted to the monitor by using the wireless means, such as a radio wave or an infrared ray. As these wireless transmitting means and wireless receiving means necessary in the monitor side, an ordinary known technology can be used.

The fluoroscopy image apparatus of the invention is structured as described above, and apart from the ordinary control circuit, the TV reference signal circuit for forming the reference signal, such as the TV frame synchronization signal, and the picture signal superimposed circuit, which switches the respective lines of the image sensor in response to these signals and mixes the signals with the synchronization signals to output the mixed signals, are built in the flat panel. Therefore, even if the system failure of the control circuit occurs, the X-ray image can be displayed in the monitor by the analog video output in the general TV standard scanning system.

Also, since the gate driver circuit and the readout amplifier are driven and controlled so that a plurality of pixels in the image sensor is combined as one pixel unit, the effective sensor region can be changed and selected in accordance with the size of an examined portion.

Further, since the wireless transmitting means by the radio wave or the infrared ray is provided, a cable is not necessary, and the X-ray image can be observed by the monitor at a remote place.

Also, since there is provided the digital-to-analog switching circuit which switches between the digital output and the analog output to be able to use both the outputs, the monitor in the apparatus and the monitor at the remote place can be switched to each other to be used in accordance with the necessity.

While the invention has been explained with reference to the specific embodiments of the invention, the explanation is illustrative and the invention is limited only by the appended claims.

What is claimed is:

1. A fluoroscopy image apparatus, comprising:

two-dimensional radiation sensor arrays formed of photoelectric conversion elements for outputting charge signals corresponding to an incident amount of radiation, switches arranged in a matrix form under the radiation sensor arrays and connected to the photoelectric conversion elements, a gate drive circuit connected to the switches for turning on the respective switches in case of reading out the charge signals, a readout amplifying circuit connected to the sensor arrays for reading out the charge signals stored in respective pixels, a control circuit connected to the gate driver circuit and the readout amplifying circuit for controlling the same, a digital-to-analog switching circuit connected to the control circuit for switching between a digital video control and an analog video control so as to use one of the controls, a TV reference signal circuit connected to the control circuit and the gate drive circuit for controlling the gate drive circuit in the analog video control, said TV reference signal circuit having a horizontal scanning/synchronization pulse waveform generating circuit and a vertical scanning/synchronization pulse waveform generating circuit, and a picture signal superimpose circuit connected to the TV reference signal circuit and the readout amplifying circuit, said gate driver circuit, upon actuating the analog video control, being driven by signals from the TV reference signal circuit for taking out picture signals from the radiation sensor arrays through the readout amplifying circuit and said picture signal superimpose circuit superimposing the picture signals on the signals from the TV reference signal circuit by synchronizing with the signals from the TV reference signal circuit to thereby output a TV analog video signal.

2. A fluoroscopy image apparatus according to claim 1, further comprising a pixel control circuit connected to the gate driver circuit and the readout amplifying circuit for controlling the same so that a plurality of pixels is joined as one pixel unit when the charge signals of the radiation sensor arrays are read out and scanned as the analog video control.

3. A fluoroscopy image apparatus according to claim 2, wherein said pixel control circuit is operated in the analogue video control.

4. A fluoroscopy image apparatus according to claim 1, further comprising wireless transmitting means for wirelessly transmitting the outputted analog video signal.

5. A fluoroscopy image apparatus according to claim 1, further comprising a correction processing circuit connected to the readout amplifier so that sensitivity correction and offset correction are carried out per sensor, and image processing circuit connected to the correction processing circuit to output a digital video signal separately from the picture signal superimpose circuit so that the fluoroscopy image apparatus is generally operated by the digital video control and is operated by the analog video control when the control circuit is not operated properly.

6. A fluoroscopy image apparatus according to claim 5, wherein said correction processing circuit is also connected to the picture signal superimpose circuit.

7. A fluoroscopy image apparatus according to claim 6, wherein said control circuit is used only in the digital video control.

* * * * *